Aug. 7, 1923.

W. PATERSON 1,464,291

APPARATUS FOR TREATING LIQUIDS WITH CHEMICAL REAGENTS

Filed Sept. 20, 1922          5 Sheets-Sheet 1

Inventor
W. Paterson,
By Marks Clerk
Attys.

Figure 1:
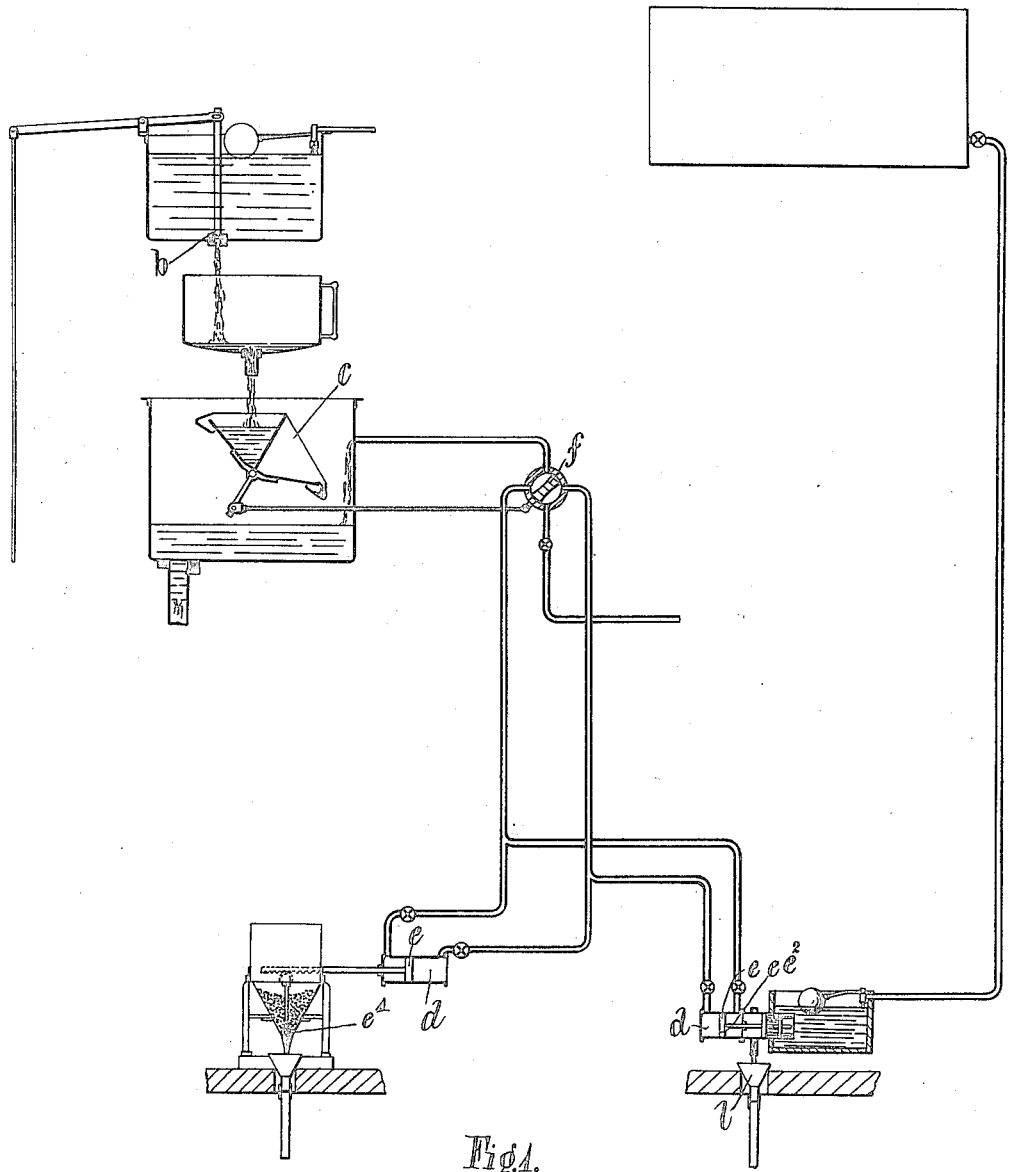

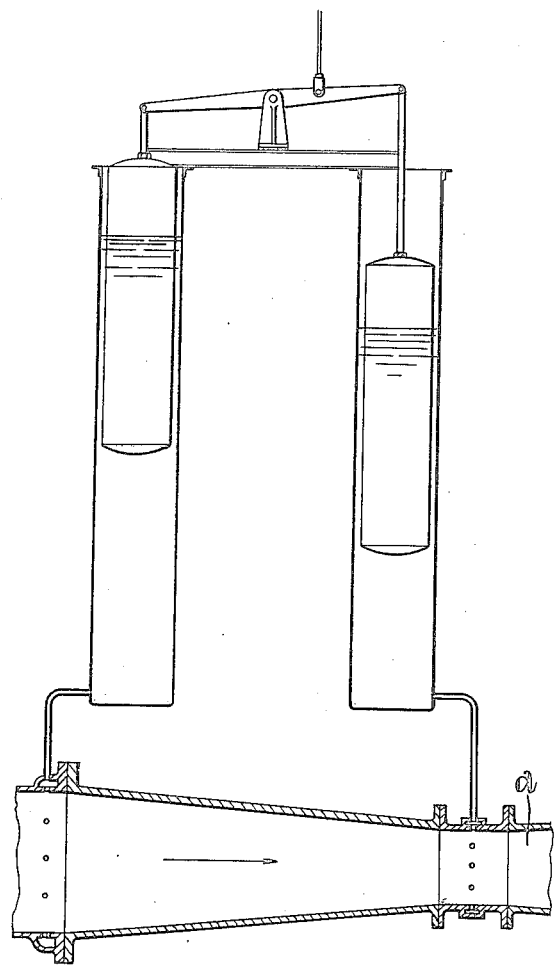
Fig.1ª

Aug. 7, 1923.

W. PATERSON 1,464,291

APPARATUS FOR TREATING LIQUIDS WITH CHEMICAL REAGENTS

Filed Sept. 20, 1922     5 Sheets-Sheet 3

Inventor
W. Paterson,
By Marks&Clerk
Attys.

Figure 2:
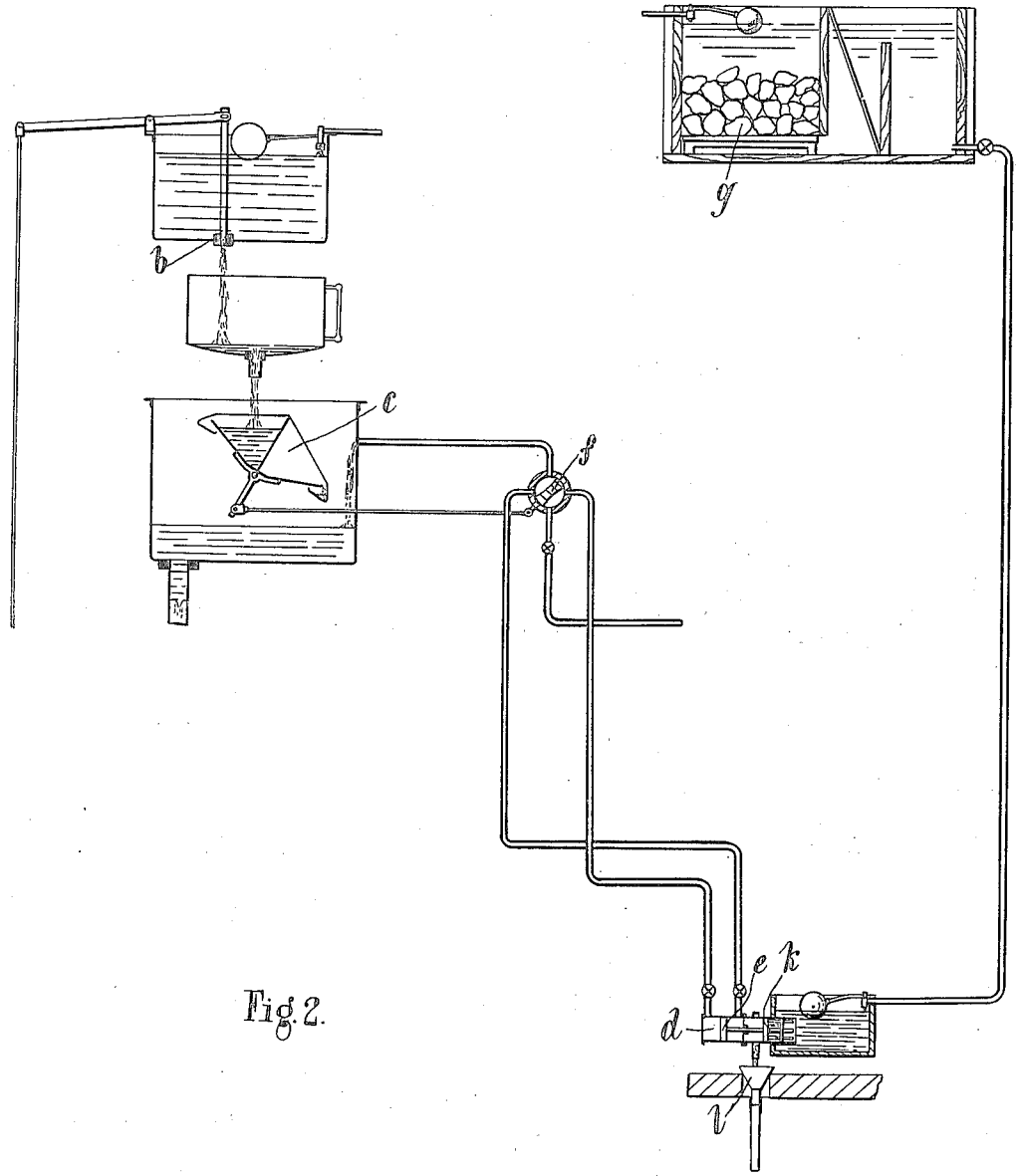

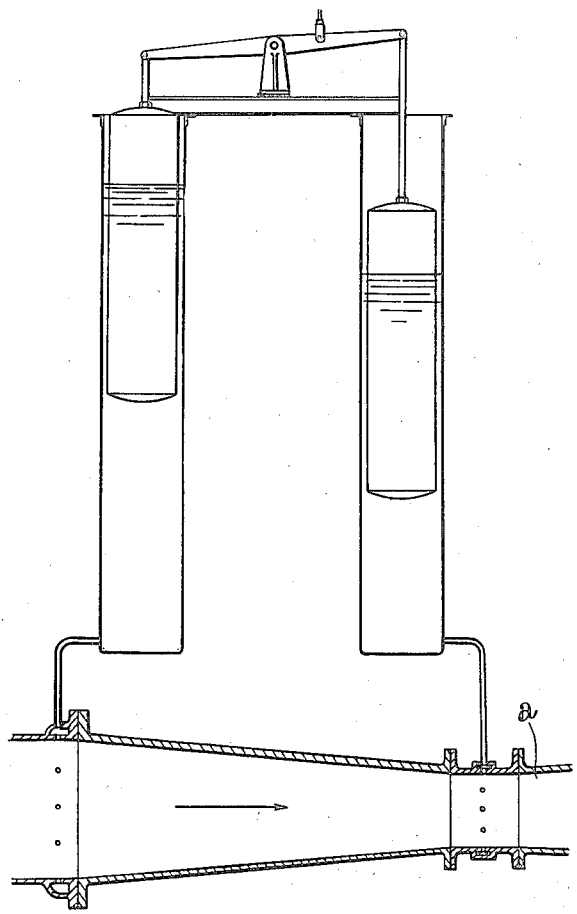
Fig 2ª

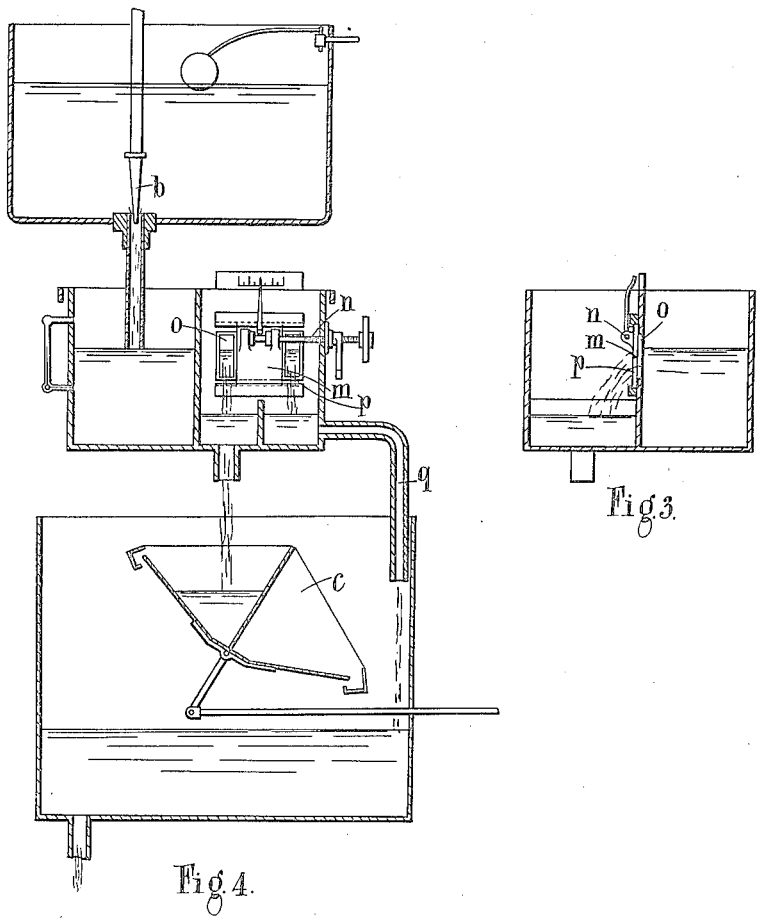

Patented Aug. 7, 1923.

1,464,291

UNITED STATES PATENT OFFICE.

WILLIAM PATERSON, OF LONDON, ENGLAND.

APPARATUS FOR TREATING LIQUIDS WITH CHEMICAL REAGENTS.

Application filed September 20, 1922. Serial No. 589,451.

*To all whom it may concern:*

Be it known that I, WILLIAM PATERSON, a subject of the King of Great Britain and Ireland, and residing at Windsor House, Kingsway, London, W. C. 2, England, have invented certain new and useful Improvements in Apparatus for Treating Liquids with Chemical Reagents, of which the following is a specification.

This invention relates to apparatus for treating liquids (such, for example, as water softening or purifying apparatus) by the addition of chemical solutions or powdered reagents, and has for its object to provide improved means for adding these in proportion to the rate of flow of liquid to be treated.

In one form, the invention has particular reference to apparatus in which the main flow is measured by being passed through a Venturi tube, and consists in utilizing such measuring means or devices to actuate means which effects the addition of reagent or reagents in proportion to the rate of flow of the main body of liquid.

The invention also consists in continuously generating a concentrated solution of reagent and adding this concentrated solution intermittently or continuously at any predetermined rate to the main flow.

The invention further consists in utilizing the measuring means or devices to control the flow of a minor body of liquid which is proportional to the main flow and which actuates means effecting the addition of reagent or reagents in proportion to such main flow.

The invention still further consists in the provision of means for varying the rate of proportional addition of reagent or reagents without interfering with the continuous operation of the plant.

The invention still further consists in the provision of means for controlling the flow of concentrated solution in proportion to the main flow of liquid to be treated.

The invention further consists in the provision of means for varying the rate of proportional addition of the concentrated reagent without interfering with the continuous operation of the plant.

The invention still further consists in other details and arrangements hereinafter described or indicated.

In the accompanying drawing:—

Figures 1 and $1^a$ show diagrammatically one form of apparatus in accordance with my invention.

Figures 2 and $2^a$ show a modification of the apparatus shown in Figure 1.

Figure 3 is a sectional elevation view of a form of apparatus for varying the rate of proportional addition and Figure 4 is a side sectional elevation of a part of Figure 3.

In these figures like reference letters indicate corresponding parts.

In carrying my invention into effect in the manner shown in Figures 1 and $1^a$, which show by way of example the application of the invention to the treatment of water with a chemical solution such as aluminum sulphate or powdered reagent such as chalk or lime hydrate, I provide a Venturi tube $a$, for the purpose of measuring the main flow, and I arrange the Venturi head in the main flow so as to control the discharge of a minor volume of water through means such as a taper valve $b$ at a rate which is directly proportional to the main flow, which minor body of water is passed through an oscillating meter $c$ which through a hydraulic relay effects the intermittent discharge of a definite volume of chemical solution or powdered reagent.

In the drawing I have shown a hydraulic relay comprising a cylinder $d$ having a piston $e$ therein and to which water under pressure controlled by a four-way valve $f$ is admitted, the piston being connected to the reagent distributing device.

The minor body of water may be passed through a divider which may be adjustable in such a manner as to deflect any proportion of the minor volume from the secondary metering device $c$ so that either the whole or any fractional part of the minor flow may control the supply of reagent, and by the arrangement and combination of parts above described I ensure that the reagent added is proportional to the variations in the main flow while at the same time the rate of addition (in, say, grains per gallon) may be varied between a known maximum figure and any desired minimum by simply adjusting the divider or deflecting device without in any way interfering with the continuous operation of the plant.

Figures 3 and 4 show one form of divider weir which may be employed as above described and which comprises a weir plate $m$ movable by suitable means such as a screw $n$ and adapted to control the slots $o$ and $p$, one of which $o$ passes liquid to the secondary meter $c$, while the other $p$ passes liquid through the bypass tube $q$ to waste. Thus by moving the plate $m$ in one direction or the other more or less liquid will be admitted to the secondary meter so that the rate of operation of the meter will thereby be varied and thus the rate of proportional addition of the reagent will be correspondingly varied.

The meter $c$, through which the minor body of the water or any fractional part thereof passes, is arranged to govern the frequency with which the definite volume of chemical solution or powdered reagent is added to the liquid through the medium of a hydraulic relay device. For example, in the treatment of water supplies where a high pressure source of water is almost invariably available the movements of the meter may be adapted to control the flow of pressure water to one side or the other of the piston $e$ operating the chemical discharge device as described above.

In the case of a solid reagent in powdered form the movement of the piston may be imparted by suitable means such as a rack and pinion, to a feed screw $e'$, or other operative device, adapted to discharge a definite weight of reagent at each stroke or movement.

Where the reagent is in the form of a solution each stroke of the plunger effects the discharge of a definite volume of solution by means of a plunger $e^2$, and it is clear that in any modification of the invention the stroke of the piston or plunger may be varied by any suitable means for the purpose of varying the amount of solid or liquid reagent discharged for each movement of the plunger.

The modification shown in Figures 2 and $2^a$ is similar to that shown in Figures 1 and $1^a$ with the exception that such apparatus is adapted for dealing with a concentrated solution of reagent, such as sulphate of alumina, which is continually generated by the automatic ingress of water to and through a chamber $b$ containing the solid soluble reagent in excess.

I may arrange for the dilution of the concentrated solution which is continuously or intermittently discharged in accordance with the invention by means, for example, of a continuous volume of water passing into a mixing and diluting pot or receptacle $l$ so that there will be a continuous stream of the diluted reagent added to the main flow of liquid to be treated.

Further, it will be obvious that the devices described can be arranged to proportion more than one chemical solution or powdered reagent or both simultaneously, the rate of addition of each being independently adjustable during the continuous operation of the plant while at all times they are in ratio to the main flow.

It is to be understood that the invention may be applied in general to all cases where it is required to add a solid or liquid reagent or substances to a main flow of liquid in proportion to such main flow, and I may vary the details of construction and the arrangement of the various parts in any manner which will be found to give most satisfactory results in practice having regard to the particular application of the invention or any practical requirements that may have to be fulfilled.

Having now described my invention what I claim as new and desire to secure by Letters Patent is:—

1. Apparatus for the treatment of a liquid with a chemical reagent, comprising in combination means for measuring the flow of liquid to be treated, a secondary liquid supply the flow of which is proportionally controlled by said measuring means, and means whereby said secondary liquid supply may effect the proportional addition of reagent to the main flow of liquid.

2. The combination with apparatus according to claim 1 of means for varying the rate of proportional addition of reagent or reagents.

3. Apparatus for the treatment of a liquid with a chemical reagent, comprising in combination means for measuring the flow of liquid to be treated, a secondary liquid supply the flow of which is proportionally controlled by said measuring means, a meter actuated by said proportional liquid supply for setting in operation means for supplying chemical reagent to the main flow of liquid.

4. Apparatus according to claim 3 having a valve actuated by the meter to control pressure to a hydraulic relay controlling the reagent supply to the main flow of liquid.

5. Apparatus for the treatment of a liquid with a chemical reagent, comprising in combination means for measuring the flow of liquid to be treated, a secondary liquid supply the flow of which is controlled by a taper valve connected to the main flow measuring means, a meter actuated by said secondary supply, a valve actuated by said meter controlling pressure supply to a hydraulic relay and means actuated by said relay for supplying chemical reagent to the main body of liquid to be treated.

6. Apparatus according to claim 5 having means for by-passing a proportion of said secondary supply from the meter in order to vary the rate of proportional addition of the reagent to the liquid to be treated.

7. Apparatus for the treatment of a liquid with a chemical reagent, comprising in combination a Venturi meter for measuring the flow of liquid to be treated, floats controlled by said Venturi meter, a taper valve actuated by said floats to control the flow of a secondary supply of liquid and a meter device actuated by said secondary flow and controlling the supply of reagent to the liquid to be treated.

8. Apparatus for the treatment of a liquid with a chemical reagent comprising in combination a Venturi meter for measuring the flow of liquid to be treated, a secondary liquid supply the flow of which is controlled by a taper valve actuated by said Venturi meter, an oscillating secondary meter actuated by said secondary liquid flow, a pressure controlling valve actuated by said secondary meter, a hydraulic relay connected with said pressure controlling valve and reagent distributing means operated by said relay.

In testimony whereof I have signed my name to this specification.

WM. PATERSON.